US006657774B1

(12) United States Patent
Evans et al.

(10) Patent No.: US 6,657,774 B1
(45) Date of Patent: Dec. 2, 2003

(54) AMPLIFIER SYSTEM WITH DISTRIBUTED AND DISCRETE RAMAN FIBER AMPLIFIERS

(75) Inventors: Alan F. Evans, Beaver Dams, NY (US); George F. Wildeman, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 09/641,577

(22) Filed: Aug. 18, 2000

(51) Int. Cl.[7] .............................. G02B 6/26; H01S 3/30; H01S 3/06
(52) U.S. Cl. .................... 359/334; 359/124; 359/337.4; 359/337.5; 359/341.32; 372/3
(58) Field of Search ................................. 359/124, 334, 359/337.4, 337.5, 341.32; 372/3

(56) References Cited

U.S. PATENT DOCUMENTS

| 5,035,481 | A | * | 7/1991 | Mollenauer | 359/341 |
|---|---|---|---|---|---|
| 5,058,974 | A | * | 10/1991 | Mollenauer | 385/27 |
| 5,185,814 | A | * | 2/1993 | Healey | 359/160 |
| 5,195,160 | A | * | 3/1993 | Byron | 385/123 |
| 5,321,707 | A | * | 6/1994 | Huber | 372/6 |
| 5,392,154 | A | * | 2/1995 | Chang et al. | 359/341 |
| 5,430,572 | A | * | 7/1995 | DiGiovanni et al. | 359/341 |
| 5,561,552 | A | * | 10/1996 | Shibuya | 359/341 |
| 5,673,280 | A | * | 9/1997 | Grubb et al. | 372/3 |
| 6,115,174 | A | * | 9/2000 | Grubb et al. | 359/331 |
| 6,151,160 | A | * | 11/2000 | Ma et al. | 359/341 |
| 6,172,803 | B1 | * | 1/2001 | Masuda et al. | 359/341 |
| 6,204,960 | B1 | * | 3/2001 | Desurvire | 359/341 |
| 6,292,288 | B1 | * | 9/2001 | Akasaka et al. | 359/334 |

FOREIGN PATENT DOCUMENTS

| EP | 734105 | * | 9/1996 | | |
|---|---|---|---|---|---|
| JP | 4-9929 | * | 1/1992 | | |
| JP | 10-22555 | * | 1/1998 | | |
| JP | 75001 | * | 3/1998 | | |
| WO | WO 99 43107 A | | 8/1999 | ............ | H04B/10/17 |

OTHER PUBLICATIONS

Masuela et al, E COC '99, 25th European Conf. Pct. Con. vol. 2, pp146–7; abst. only herewith, Sep. 30, 1999.*
Masuda et al, E COC '97, Conference Public. No. 4481 1EE, Sep. 25, 1997, pp 73–76.*
Nielsen et al, Opt. Fiber Commun. Conf., vol. 37, Mar. 10, 2000, pp 236–238; abst. only herewith.*
Naito T, "One Terabit/s Transmission Over 10,000 KM Using C–Band and L0Band" Proceedings of the European Conference on Networks and Optical Communications 2000. NOC 200. WDM and Photonic Networks, Proceedings of the European Conference on Networks and Optical Communications. NOC, Amsterdam: IOS Press, NL, Prt 1 of 2, 2000, pp. 2–9.

* cited by examiner

*Primary Examiner*—Nelson Moskowitz
(74) *Attorney, Agent, or Firm*—Wilson Sonsini; Goodrich & Rosati; Kenta Suzue

(57) ABSTRACT

An amplifier system includes: (i) a distributed Raman fiber amplifier and; (ii) a discrete Raman fiber amplifier that includes dispersion compensated fiber. The discrete Raman fiber amplifier is operatively connected to the distributed Raman fiber amplifier and amplifies signals received from the distributed Raman fiber amplifier. In one embodiment, at least one source of pump signal is coupled to the distributed and to the discrete Raman fiber amplifier. The distributed Raman fiber amplifier and the discrete Raman fiber amplifier in this embodiment share optical pump power provided by the shared pump. In one embodiment of the present invention an Erbium doped fiber amplifier (EDFA) is operatively connected to a discrete Raman fiber amplifier and the Erbium dope fiber amplifier amplifies signals received from the discrete Raman fiber amplifier.

19 Claims, 4 Drawing Sheets

AMPLIFIER SYSTEM WITH DISTRIBUTED AND DISCRETE RAMAN FIBER AMPLIFIERS

BACKGROUND OF THE INVENTION

1. Field of the Invention

This invention relates to optical amplifier systems and more particularly, to systems including distributed and discrete Raman amplifiers.

2. Technical Background

Long distance communication systems typically use erbium doped fiber amplifiers between long spans of transmission fiber. A typical configuration for the erbium doped fiber amplifier includes one or more pump lasers operating at wavelengths of 980 nm or 1480 nm and providing an output coupled into the erbium doped fiber. Erbium doped fiber amplifiers (EDFAs) are discrete amplifiers. Such amplifiers are used to provide sufficient gain to compensate for loss of signal in transmission fiber, often requiring multiple high power pumps. Erbium doped fiber amplifiers are used to produce high power out-going signal because, otherwise, as the signal travels through the transmission fiber, the attenuated signal level would approach the noise level by the time it reaches the next amplifier. Erbium doped fiber amplifiers typically have to be positioned at about one hundred kilometers or less from one another, otherwise the signal level would drop down to approximately the noise level before reaching the next EDFA and the next amplifier might not be able to distinguish between the noise and the signal.

Discrete Raman fiber amplifiers can be used as amplifying devices that compensate for losses incurred by the signal during its transmission through the transmission fiber. For this purpose, the discrete Raman fiber amplifiers would also be situated between long lengths (typically 40–100 kilometers) of transmission fiber. Unfortunately, an amplifier system with only discrete Raman amplifiers suffers from MPI (multipass interference), from double Rayleigh backscattering, and gain saturation from the pump depletion.

Distributed Raman fiber amplifiers are sometimes used in conjunction with the Erbium doped fiber amplifiers. The typical distributed Raman fiber amplifiers utilize typical transmission fiber as the gain medium. However, the signal propagating through the distributed Raman amplifier undergoes distortion and, thus becomes broader due to chromatic effects produced by the fiber. This distorted signal is provided to and is amplified by the Erbium doped amplifier and, contributes to reduction of the signal to noise ratio. In order to compensate for the signal broadening, such an amplifier system typically utilizes a multistage Erbium doped fiber amplifier, which has a dispersion compensating fiber between the two amplifying stages of the Erbium-doped amplifier. Splicing a dispersion compensating fiber between two stages of the Erbium doped fiber amplifier introduces about 10 dB loss into the amplifier, which may be overcome by additional pumping power with a resulting increase in cost.

SUMMARY OF THE INVENTION

According to one aspect of the present invention an amplifier system includes: (i) a distributed Raman fiber amplifier and; (ii) a discrete Raman fiber amplifier that includes dispersion compensated fiber. The discrete Raman fiber amplifier is operatively connected to the distributed Raman fiber amplifier and amplifies signals received from the distributed Raman fiber amplifier. In one embodiment, at least one source of pump signal is coupled to the distributed and to the discrete Raman fiber amplifier. The distributed Raman fiber amplifier and the discrete Raman fiber amplifier in this embodiment share optical pump power provided by the shared pump. In one embodiment of the present invention an Erbium doped fiber amplifier (EDFA) is operatively connected to a discrete Raman fiber amplifier and the Erbium dope fiber amplifier amplifies signals received from the discrete Raman fiber amplifier.

It is an advantage of the amplifier system of the present invention to have no or only minimal signal broadening without center stage a dispersion compensation fiber between EDFA stages. The loss, which would have been attributable to a dispersion amplifier, can instead be allocated to other components, such as Add/Drop multiplexer, polarization mode dispersion compensator, or dynamic gain equalization components.

It is another advantage of this invention that the optical amplifiers can be spaced at more than one hundred kilometers away from one another because the transmission losses are minimized due to use of distributed Raman fiber amplifiers.

For a more complete understanding of the invention, its objects and advantages refer to the following specification and to the accompanying drawings. Additional features and advantages of the invention are set forth in the detailed description, which follows.

It should be understood that both the foregoing general description and the following detailed description are merely exemplary of the invention, and are intended to provide an overview or framework for understanding the nature and character of the invention as it is claimed. The accompanying drawings are included to provide a further understanding of the invention, and are incorporated in and constitute a part of this specification. The drawings illustrate various features and embodiments of the invention, and together with the description serve to explain the principles and operation of the invention.

DETAILED DESCRIPTION OF THE PREFERRED EMBODIMENTS

Figure 1:
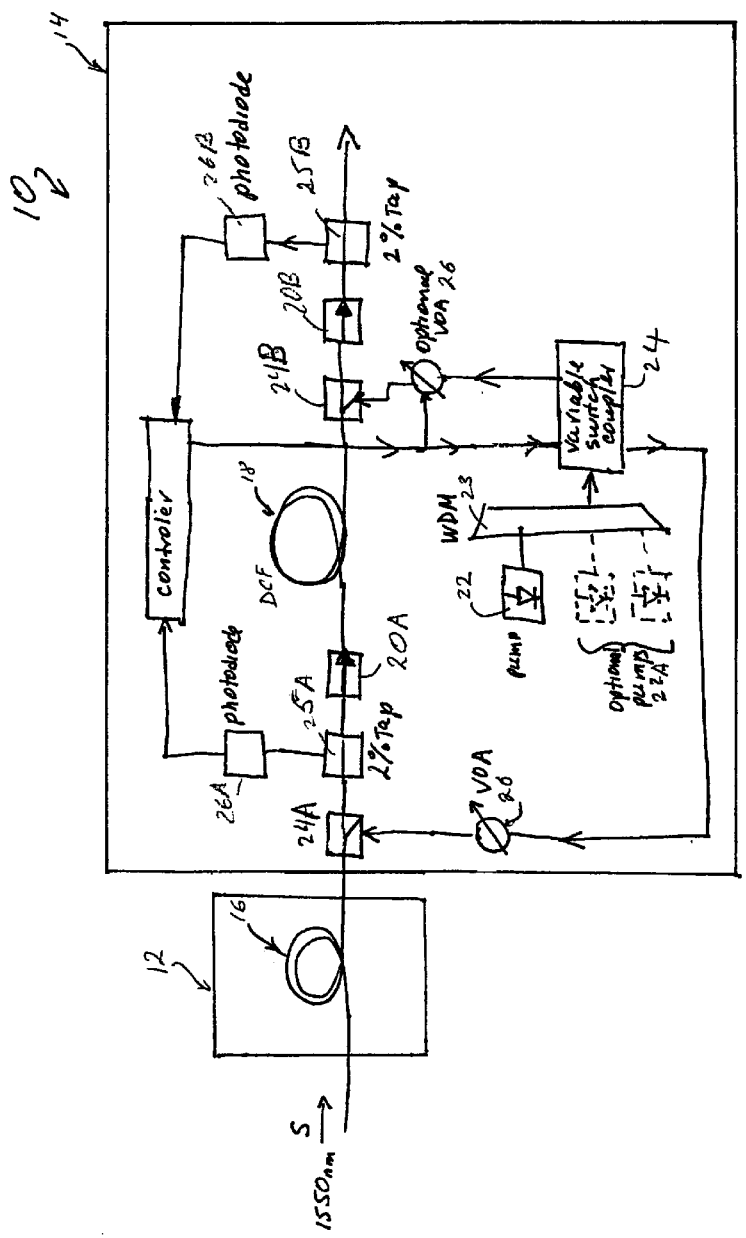
FIG. 1 illustrates schematically a distributed Raman amplifier operatively connected to a discrete Raman amplifier that includes dispersion compensating fiber.

Reference will now be made in detail to the present embodiments of the invention, examples of which are illustrated in the accompanying drawings. Wherever possible, the same reference numbers will be used throughout the drawings to refer to the same or like parts. The first exemplary embodiment of the amplifier system of the present invention is shown in FIG. 1, and is designated generally throughout by reference numeral 10. In accordance with the invention, the amplifier system 10 includes a distributed Raman fiber amplifier 12 and a discrete Raman fiber amplifier 14. The distributed Raman fiber amplifier 12 includes a length of transmission fiber 16 which is being Raman pumped by a counter propagating pump light. The effective length of the Raman pumped fiber 16 is between 40 km and 100 km, corresponding to the transmission span length. In a communication system the term "transmission span length" refers to the length of transmission fiber between two discrete amplifiers. Thus, the transmission fiber of the distributed Raman amplifier forms a "transmission span". Fiber 16 is, for example, a single mode fiber such as ITU standard designated fiber like G.652, G.653, or G.654. More specifically, fiber 16 may be SMF-28™ fiber, SMF-DS™ fiber, or LEAF® fiber commercially available from Corning, Incorporated of Corning, NY. The signal propagating through this fiber 16 is amplified and, because of this, does not attenuate as rapidly as the signal propagating through a regular unpumped transmission fiber. The discrete Raman fiber amplifier 14 of this embodiment includes one or more coils of dispersion compensated fiber 18 as at least a part of the amplification (i.e. gain) medium of the discrete Raman fiber amplifier 14. Regular transmission fiber may also form a part of the amplification medium of the discrete Raman fiber amplifier. The dispersion compensation fiber 18 may be, for example, Pure Mode™ DCF fiber, DCF-40™ fiber, DCM-60™ fiber, or DCM-80™ fiber, available from Corning, Incorporated. Utilizing the dispersion compensating fiber 18 as an amplifying medium enables the dispersion compensating fiber 18 to contribute to the amplification while it is compensating for the signal broadening.

Figure 2:
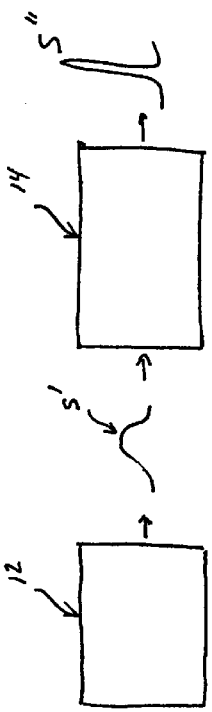
FIG. 2 illustrates schematically an in-coming signal entering the distributed Raman amplifier of FIG. 1, a broadened out-going signal exiting this amplifier and a corrected signal exiting the discrete Raman amplifier of FIG. 1.

More specifically, the discrete Raman fiber amplifier 14 is optically coupled and operatively connected to the distributed Raman fiber amplifier 12. The discrete Raman fiber amplifier 14 amplifies signals S' received from this distributed Raman fiber amplifier 12, providing a further amplified signal S'. The out-going signal S' from the distributed Raman amplifier 12 are typically broadened (up to about ⅓ of a bit period relative to the in-coming signal S) due to chromatic dispersion effects introduced by the transmission fiber 16 of the distributed Raman amplifier 12. It an advantage of the present invention that discrete Raman fiber amplifier 14 utilizes the at least one coil of dispersion compensating fiber 18 to correct for this signal broadening, by providing dispersion compensation in, for example, the 1530 nm to 1570 nm signal band. This is shown schematically in FIG. 2.

The dispersion compensating fiber 18 could be pumped just enough to make a loss-less broad band compensator. That is, the dispersion compensating fiber 18 can be pumped just enough to provide no gain or loss. A broad band is a wavelength band that is larger than 30 nm and is preferably 100 nm or even larger. In the amplifier system depicted in FIG. 1 the dispersion compensating fiber 18 is pumped by a 200 mW pump to make the dispersion compensating fiber 18 a loss-less compensator. This pump provides optical pump signal in 1400 nm to 1500 nm range. If the dispersion compensating fiber 18 is provided with additional pump power, the discrete Raman fiber amplifier 14 will contribute net gain to the amplifier system 10.

In the illustrated embodiment, the discrete Raman fiber amplifier 14 also includes at least one isolator for preventing optical noise in the 1550 nm range from propagating in a direction counter to the signal direction. In this embodiment, the discrete Raman fiber amplifier 14 includes two isolators 20A and 20B with the gain fiber and/or the dispersion compensating fiber 18 in between. The first isolator 20A, on the upstream side of the fiber 18, prevents counter propagating noise signal from entering the distributed Raman fiber amplifier 12. The second isolator 20B, on the downstream side of the fiber 18, prevents counter propagating noise signal from entering the dispersion compensating fiber 18.

In this embodiment, a 1450 nm pump 22 provides counter propagating pump light to both the DCF 18 and Distributed Raman fiber amplifier 12. It is preferred that the pump 22 provides counter (with respect to the direction of signal propagation) propagating pump energy, because such configuration reduces modulation of the optical signal produced by modulation of pump induced noise. However, co-directional pumping (i.e., pumping in the same direction as the signal being amplified) may be utilized if the noise of the pump is reduced (i.e. if the spectral coherence of the pump is increased). Additional pumps 22A may also be utilized to provide more pump power. These pumps 22, 22A may be coupled together, for example by a wave division multiplexer 23. More specifically, in this embodiment, the pump 22 may be a shared fiber Bragg grating stabilized Fabry Perot semiconductor laser diode pump. The pump light provided by the pump 22 enters a coupler 24 (for example, a tap beam splitter, a variable switch coupler or a 3 dB coupler) which channels a smaller portion of the pump light toward a wavelength selective coupler 24B dedicated to the discrete Raman amplifier 14 and a greater portion of the pump light toward the wavelength selective coupler 24A dedicated to the distributed Raman amplifier 12. The amount of light provided by the pump 22 may be controlled, for example, via input and output 2% tap couplers 25A, 25B, photo diodes 26, and feedback circuit to the voltage-controlled switch coupler 24 and the variable optical attenuator VOA 26, to provide gain control for the distributed and discrete Raman amplifiers.

Figure 3:
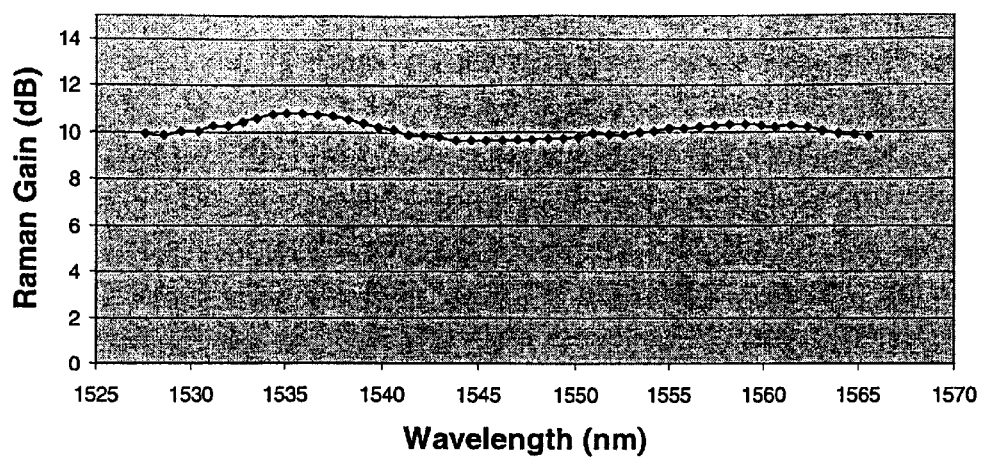
FIG. 3 illustrates the gain profile of the amplifier system of FIG. 1.

The gain profile of the above described amplifier system of FIG. 1 is shown in FIG. 3. As we can see, this amplifier system has a relatively flat gain curve even though the pump is being shared by the discrete Raman amplifier and the distributed Raman amplifier.

Figure 4:
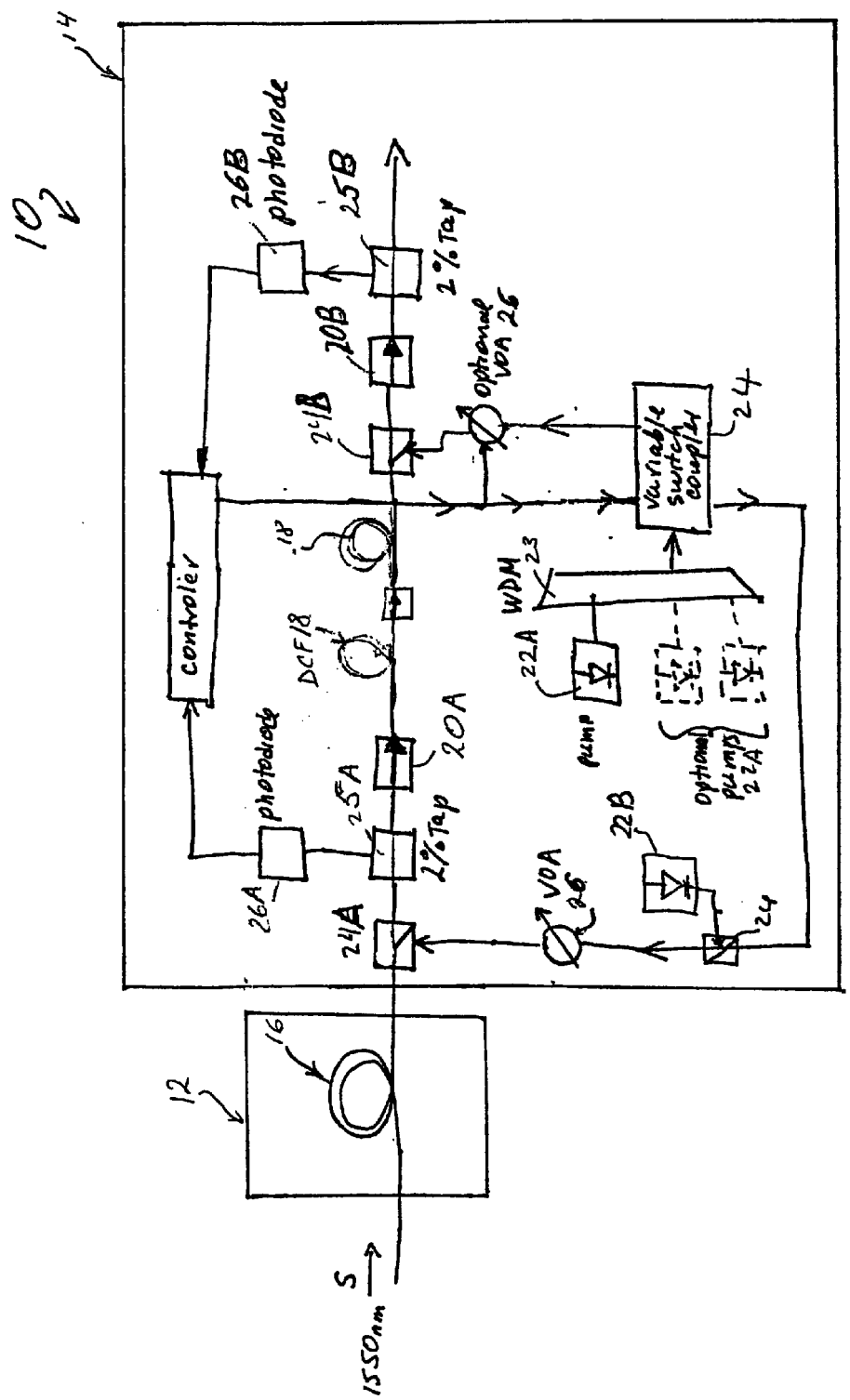
FIG. 4 illustrates schematically a distributed Raman amplifier operatively connected to a discrete Raman amplifier, where the residual pump from the discrete Raman amplifier is shared within the distributed Raman amplifier.

FIG. 4 illustrates an amplifier system similar to the one depicted in FIG. 1. However, the amplifier system illustrated in FIG. 4 utilizes two coils of dispersion compensating fiber 18 and an optical component coupled therebetween. The amplifier system illustrated in FIG. 4 also utilizes two sets of pumps 22A, 22B, one of which (22A) is being shared by the distributed Raman fiber amplifier 12 and the discrete Raman fiber amplifier 14. The other pump 22B supplies pump light to the distributed Raman amplifier 12. This configuration conserves remnant pump power from the discrete Raman fiber amplifier 14 and applies it to the distributed Raman amplifier 12. This pumping configuration provides more pumping power to the amplifier system 10 and, therefore, results in more gain and more output power out of the amplifier system. The distributed and the discrete Raman amplifiers may also share more optical pumps in a similar manner.

As embodied herein, and depicted in FIGS. 1 and 4, the wavelength selective couplers 24A and 24B may pass the signal light (typically centered at about the 1550 nm wavelength) in one direction and reflect pump light 1400 nm to 1500 nm in another direction. Thus, the signal S' is routed by wavelength selective coupler 24A from the distributed Raman fiber amplifier 12 towards the discrete Raman fiber amplifier 14. The wavelength selective coupler 24A also routes a portion of the pump signal provided by the pump 22 towards the distributed Raman amplifier 12. Similarly, wavelength selective coupler 24B routs the signal S" out of the amplifying medium (dispersion compensating fiber 18, for example) of the discrete Raman fiber amplifier 14, while providing this amplifying medium with a counter propagating pump signal.

Figure 5:
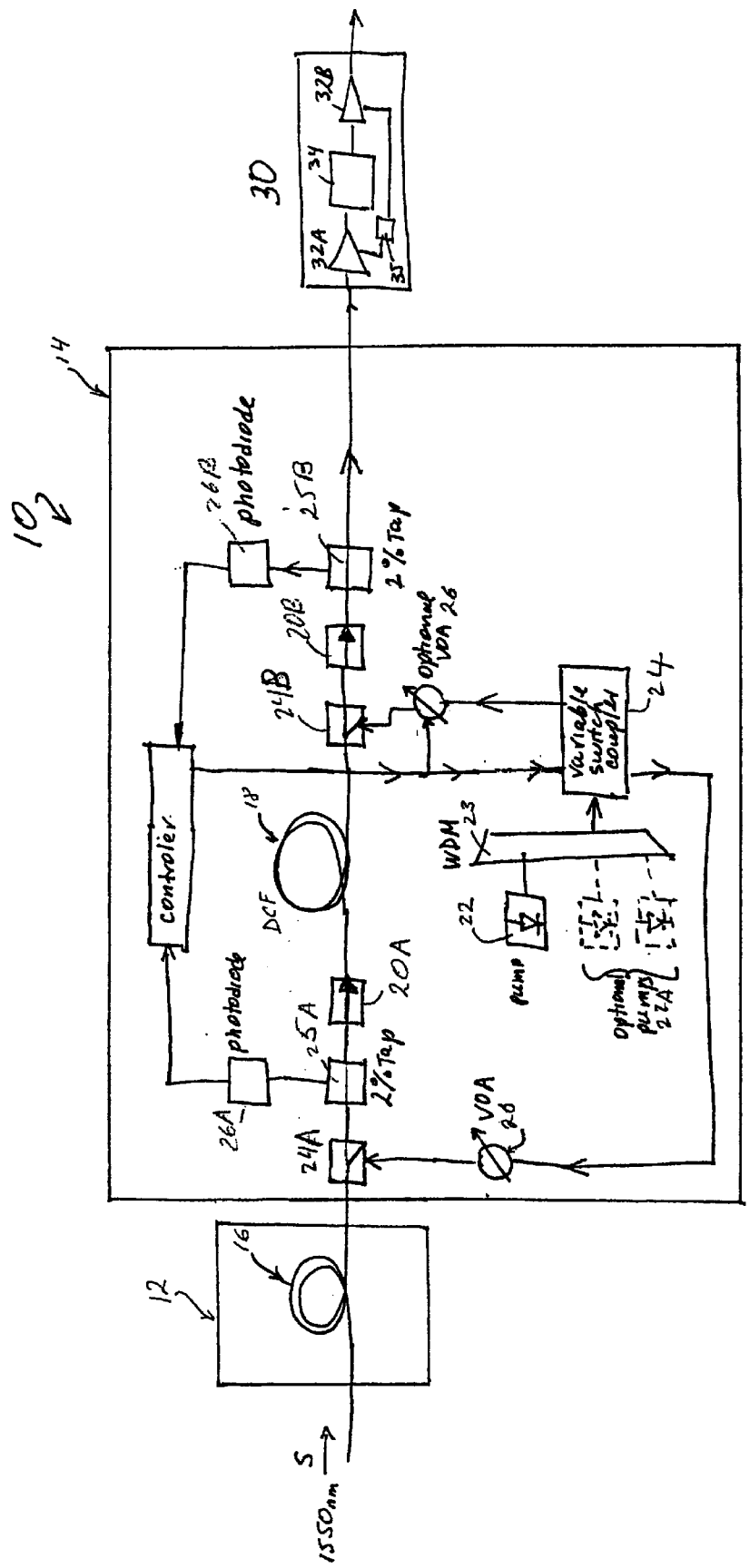
FIG. 5 illustrates the distributed Raman fiber amplifier operatively connected to a discrete Raman fiber amplifier, which is in turn operatively connected to an Erbium doped fiber amplifier.

Another alternative embodiment of the amplifier system of the invention is shown in FIG. 5. This amplifier system of FIG. 5 is similar to the amplifier system 10 illustrated in FIG. 1 in that it also utilizes the distributed Raman fiber amplifier 12 operatively connected to the discrete Raman fiber amplifier 14. However, in addition, this amplifier system also includes an Erbium doped fiber amplifier 30 optically coupled and operatively connected to the discrete Raman fiber amplifier 14. The Erbium doped fiber amplifier 30 may be, for example, a multistage amplifier with amplification stages 32A and 32B, an optional loss element 34 located therebetween and a controller 35. The loss element 34 provides approximately 4 dB to 12 dB loss in the center stage of the Erbium doped fiber amplifier. Such loss elements may be, for example, add/drop multiplexers for wavelength switching or routing, gain flattening filters, polarization mode dispersion (PMD) compensators, or dynamic gain utilization devices.

Accordingly, it will be apparent to those skilled in the art that various modifications and adaptations can be made to the present invention without departing from the spirit and scope of the invention. It is intended that the present invention cover the modifications and adaptations of this invention as defined by the appended claims and their equivalents.

What is claimed is:

1. An optical amplifier system comprising:
   (i) a distributed Raman fiber;
   (ii) a discrete Raman fiber amplifier that includes a gain medium and a dispersion compensated fiber forming at least a part of said gain medium, said discrete Raman fiber amplifier being operatively connected and optically coupled to said distributed Raman fiber amplifier, whereby it will amplify signals received from said distributed Raman fiber amplifier;
   (iii) at least one source of optical pump power coupled to both of said distributed Raman fiber amplifier and said discrete Raman fiber amplifier through two independent optical paths, whereby the distributed Raman fiber amplifier and the discrete Raman amplifier simultaneously share the optical pump power provided by said source; and
   (iv) a controller operatively connected to a variable switch coupler, said controller in conjunction with said variable switch coupler controlling the amount of optical pump power provided to said discrete Raman amplifier and said distributed Raman amplifier, such that the ratio of optical pump powers provided to said amplifiers is capable of varying.

2. An optical amplifier system comprising:
   (i) a distributed Raman fiber amplifier;
   (ii) a discrete Raman fiber amplifier that includes a gain medium and a dispersion compensated fiber forming at least a part of said gain medium, said discrete Raman fiber amplifier being operatively connected and optically coupled to said distributed Raman fiber amplifier, whereby it will amplify signals received from said distributed Raman fiber amplifier;
   (iii) a variable switch coupler; and
   (iv) at least one source of optical pump power coupled amplifier via said variable switch coupler to said distributed Raman fiber amplifier and said discrete Raman fiber through two independent optical paths, whereby the distributed Raman fiber amplifier and the discrete Raman amplifier share the optical pump power provided by said source; such that said variable switch coupler is capable of changing the amount of the optical pump power provided to each of said Raman fiber amplifiers.

3. The amplifier system according to claim 2, wherein said pump provides backward pumping for said distributed Raman fiber amplifier.

4. The amplifier system according to claim 3, wherein said pump, provides light in a 1400 nm to 1500 nm wavelength range.

5. The amplifier system according to claim 1, wherein said dispersion compensating fiber is a loss-less compensator.

6. The amplifier system according to claim 1, wherein said dispersion compensating fiber provides a net positive gain.

7. The amplifier system according to claim 1, further including an erbium doped fiber amplifier operatively connected to said discrete Raman fiber amplifier, said erbium doped fiber amplifier amplifying signals received from said discrete Raman fiber amplifier.

8. The amplifier system according to claim 1, a further comprising at least one isolator and at least one optical tap.

9. The amplifier system according to claim 1, wherein said discrete Raman fiber amplifier further comprises two optical isolators.

10. A method of amplifying an optical system comprising the steps of:
    (i) transmitting an optical signal through a distributed Raman fiber amplifier;
    (ii) amplifying said optical signal by utilizing a discrete Raman amplifier that includes dispersion compensated fiber;
    (iii) coupling at least one pump source to provide optical pump power to said distributed Raman fiber amplifier and to said discrete Raman fiber amplifier; and
    (iv) simultaneously sharing the pump power provided by said one pump source between said distributed Raman fiber amplifier and to said discrete Raman fiber amplifier and;
    (v) varying the ratio of optical pump powers provided to said distributed Raman fiber amplifier and said discrete Raman fiber amplifier by a variable switch coupler such that the pump power provided to said amplifiers is not 0% and 100%.

11. The method according to claim 10, further comprising the step of pumping said distributed to Raman amplifier and said discrete Raman amplifier with the shared optical pump.

12. The method of according to claim 10 further comprising the steps of:
    (i) providing an output signal from said discrete Raman fiber amplifier to an erbium doped fiber amplifier; and
    (ii) amplifying said provided output signal with said erbium doped fiber amplifier.

13. The amplifier system according to claim 2, wherein said dispersion compensating fiber is a loss-less compensator.

14. The amplifier system according to claim 2, wherein said dispersion compensating fiber provides a net positive gain.

15. The amplifier system according to claim 2. further including an erbium doped fiber amplifier operatively connected to said discrete Raman fiber amplifier, said erbium doped fiber amplifier amplifying signals received from said discrete Raman fiber amplifier.

16. The amplifier system according to claim 2, a further comprising at least one isolator and at least one optical tap.

17. The amplifier system according to claim 2, wherein said discrete Raman fiber amplifier further comprises two optical isolators.

18. The amplifier system according to claim 1, wherein a said discrete Raman fiber amplifier further includes: (a first tap that provides said controller with information of the amount of input signal power entering said discrete Raman fiber amplifier; wherein said variable switch coupler being capable of varying the ratio of optical pump powers provided to said discrete Raman amplifier and said distributed Raman amplifier based on the information about the amount of input signal power entering said discrete Raman fiber amplifier.

19. The amplifier system according to claim 18, said amplifier system further including: a second tap, said second tap providing said controller with information of the amount of output signal power entering said discrete optical amplifier; wherein said controller controls the amount of optical pump power provided to said discrete Raman amplifier and said distributed Raman amplifier.

* * * * *